May 7, 1935. M. N. HARRIS 2,000,228
FINGER RING
Filed Feb. 11, 1935
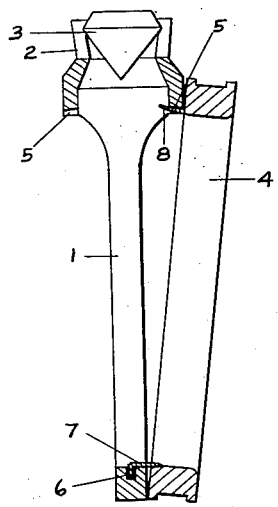
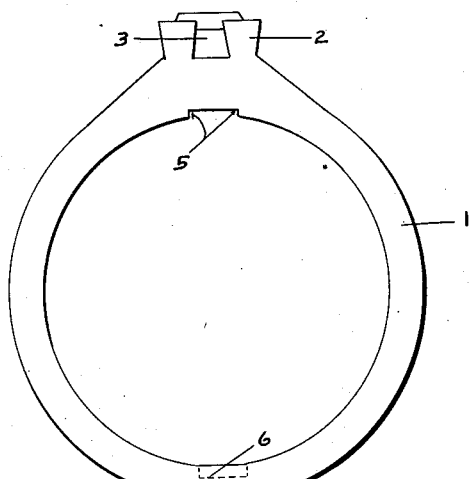
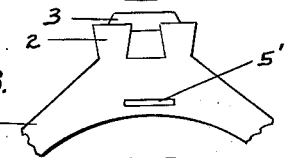
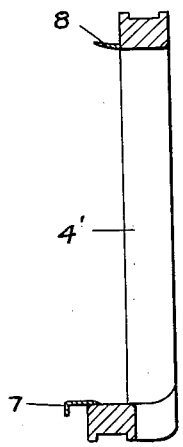
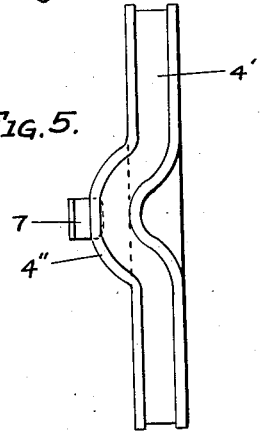
INVENTOR.
MELVIN N. HARRIS
BY
Miller Boyken & Bried
ATTORNEYS.

Patented May 7, 1935

2,000,228

UNITED STATES PATENT OFFICE 2,000,228

FINGER RING

Melvin N. Harris, Oakland, Calif.

Application February 11, 1935, Serial No. 5,936

6 Claims. (Cl. 63—15)

This invention relates to finger rings and has for its object improved construction whereby two or more rings may be detachably held together so that they will not turn relative to one another nor wear each other out as is common where the enlarged portions, ornamentation, or stone mounting of one ring interferes with an adjacent ring or rings worn on the same finger. Other advantages of the invention are simplicity and strength of construction, easily applied to any existing rings, reversibility, holding the rings at two places at opposite points of the diameter, durability of the construction, invisible in use, etc.

In the drawing accompanying this specification, Fig. 1 is an enlarged vertical section of two finger rings detachably clipped together top and bottom in accordance with my invention.

Fig. 2 is a side view of one of the rings showing the attachment notches.

Fig. 3 is a fragmentary side view of a ring similar to that of Fig. 2 showing a slot instead of the attachment notch.

Figs. 4 and 5 are detached views of the opposite member of the pair of rings showing the projecting attachment clips and a slight crook in the frame of the ring at the lower clip.

Since the improvement is more useful with two such rings as an engagement ring and a wedding ring, it is here shown applied to such a pair of rings though no limitation is to be implied thereby as it may be applied to any two rings, or in fact to several rings which it is desired to detachably clip together.

In the drawing 1 designates an engagement ring of conventional form with an enlarged portion or mounting 2 for a stone 3, while alongside of it and disposed at a slight angle from the vertical is a wedding ring 4 which may be of any type but is here shown as a rigid band of slight channeled exterior as usually used for setting circumferentially with small stones not shown.

The engagement ring 1 is notched out at 5, 5 preferably at opposite sides under the mounting with a shallow flat notch, and also centrally notched or grooved internally at the bottom as at 6 at a point diametrically opposite the upper notch or notches 5, and the wedding ring is provided with a small flat sidewise extending hook 7 which may be vertically dropped into the groove 6, and similarly provided with a small flat lip or clip 8 extending laterally and slightly upwardly from its upper portion, or point on the bore of the ring diametrically opposite clip 7, and which clip 8 fits nicely into notch 5 and snugly embraces its under side which is also preferably slightly slanted upwardly, all as shown in Fig. 1, so that in order to release the rings a prying apart effort is required at the upper portion, as with the thumb nail, to separate clip 8 from notch 5 and, after which, ring with clip 7 is easily lifted substantially vertically from groove 6.

Since the notch 5 is repeated on both sides of ring 1, ring 4 may be thus quickly attached to either side; or if groove 6 is made longer than the width of clip 7 a ring may be clipped to both sides of ring.

In considering the construction explained it will be apparent that instead of having the groove 6 in the engagement ring and the clip 7 projecting from the wedding ring, their positions may be reversed if desired.

Instead of the notch 5 being filed or otherwise formed in the bore of the ring, it may take the form of a slot 5' through the side of the mounting and the clip 8 raised to suit, but the notch is so much simpler to make in any existing ring by merely filing it out and is effective to prevent any chance displacement of the two rings that I prefer it. The very points or tips of the corners of the notch may be removed so they will not feel rough if the engagement ring is ever worn separately, though it is so small that it is unnoticed on the finger.

The little clips 7 and 8 are thin and flattened in form and are preferably made of hard strong metal, brazed, welded, soldered, or otherwise integrally attached to the bore of the ring, and their edges smoothed off so that they are imperceptible to a wearer.

The slight angular relation of the two rings as shown in Fig. 1 is not noticeable when the rings are on the finger, but by the modification shown in Figs. 4 and 5 may be avoided if desired. This consists of forming either ring with a localized lateral offset 4" at the bottom of the ring 4' and have the lower clip 7 or groove 6 as the case may be, attached to or formed in the offset portion, so as to throw the body of the ring away from the other one at the bottom and thus hold both rings parallel.

It will be understood, of course, that the engagement ring when first worn need not be notched or grooved, as this can be done at the time the wedding ring is purchased if desired, or neither ring need be arranged for clipping together until a later time, or such rings in standard sizes may be kept in stock all fitted for clipping together.

I am aware of other attempts to secure two rings together by prior inventors, but thus far they have been lacking in practicability, and I believe mine to be the first to be detachably clipped at two spaced or opposite points on the diameter, or to have the other advantages enumerated.

I therefore claim:

1. A finger ring provided with a groove in the inner surface of its bore, a second ring provided with a laterally projecting clip adapted to engage in said groove, one of said rings formed with a laterally projecting clip at a point remote on the diameter of the ring from said first-mentioned clip arranged to clip the adjacent ring in place.

2. A finger ring provided with a groove in the inner surface of its bore, a second ring provided with a laterally projecting clip adapted to engage in said groove, one of said rings formed with a laterally projecting clip at a point remote on the diameter of the ring from said first-mentioned clip arranged to clip the adjacent ring in place, and said adjacent ring formed with a seat into which said second-mentioned clip fits.

3. A finger ring provided with a groove in the inner surface of the bore, and a second ring provided with a laterally projecting clip adapted to engage in said groove to hold the rings in adjacent relation, said second ring formed with a lateral offset and from which said clip projects.

4. In combination, a pair of finger rings, one of said rings provided with a hollow stone mounting having a notch formed therein opening to the bore of the ring and also formed with a groove in the wall of its bore at a point substantially opposite said notch on the diameter of the ring, and the other ring provided with two substantially diametrically spaced laterally extending clips adapted respectively to engage said notch and said groove.

5. A finger ring provided with a groove in the inner surface of the bore, and a second ring provided with a laterally projecting clip adapted to engage in said groove to hold the rings in adjacent relation, one of said rings being bodily offset at the point of said groove and clip so as to space the remainder of the bodies of the rings apart.

6. In combination, a pair of finger rings, cooperating devices on both rings at remote points in their diameter arranged and adapted for detachably clipping the rings together with bores in alignment, and including a small substantially flat metal finger permanently secured to one of the rings in a manner to project laterally into the bore of the other ring and having its outer end turned outwardly substantially at right angles engaging said other ring, and means preventing relative rotation of the rings, said devices adapted to be manually engaged and disengaged without the use of tools.

MELVIN N. HARRIS.